United States Patent [19]
Kline et al.

[11] Patent Number: 5,375,791
[45] Date of Patent: Dec. 27, 1994

[54] HUB ALIGNING ROTARY CHUCK

[75] Inventors: Robert J. Kline, Stillwater; Thomas E. Larsen, St. Paul; Mark A. Schiesl, Hutchinson; Bruce E. Tait, Woodbury, all of Minn.

[73] Assignee: Minnesota Mining and Manufacturing Company, St. Paul, Minn.

[21] Appl. No.: 16,503

[22] Filed: Feb. 11, 1993

[51] Int. Cl.$^5$ .................... B65H 19/22; B65H 75/00
[52] U.S. Cl. ................... 242/575; 242/576.1; 242/597.6; 279/2.07
[58] Field of Search ............... 242/68.3, 68.1, 68.2, 242/72 B, 72 R, 56.9, 68.4; 279/2.06, 2.07

[56] References Cited

U.S. PATENT DOCUMENTS

| | | | |
|---|---|---|---|
| 3,025,071 | 3/1962 | Larrad | 242/72 R |
| 3,544,016 | 12/1970 | Cunningham et al. | 242/18 G |
| 3,632,053 | 1/1972 | Edwards et al. | 242/71.8 A |
| 3,934,833 | 1/1976 | Nash et al. | 242/56.9 |
| 4,332,356 | 6/1982 | Damour | 242/72 B |
| 4,461,430 | 7/1984 | Lever | 242/56.9 |
| 4,923,137 | 5/1990 | Jorgensen et al. | 242/68.5 |
| 4,978,083 | 12/1990 | Kim | 242/56.9 |

OTHER PUBLICATIONS

IBM Technical Bulletin, R. A. Stolz, Tape reel holder, Jan. 1971, PO869-0513.

Primary Examiner—Daniel P. Stodola
Assistant Examiner—John Q. Nguyen
Attorney, Agent, or Firm—Gary L. Griswold; Walter N. Kirn; Charles D. Levine

[57] ABSTRACT

A rotary chuck for winding magnetic tape aligns the winding hub in both the axial and radial directions relative to the axis of winding rotation. This allows higher winding speeds to be used and produces finished rolls of improved quality. Alignment occurs upon application of air pressure to the rotary chuck. The rotary chucks can be placed side-by-side on a single mandrel for winding multiple strands simultaneously. Winding hubs can be easily slipped on and off the rotary chucks to improve winding productivity.

17 Claims, 4 Drawing Sheets

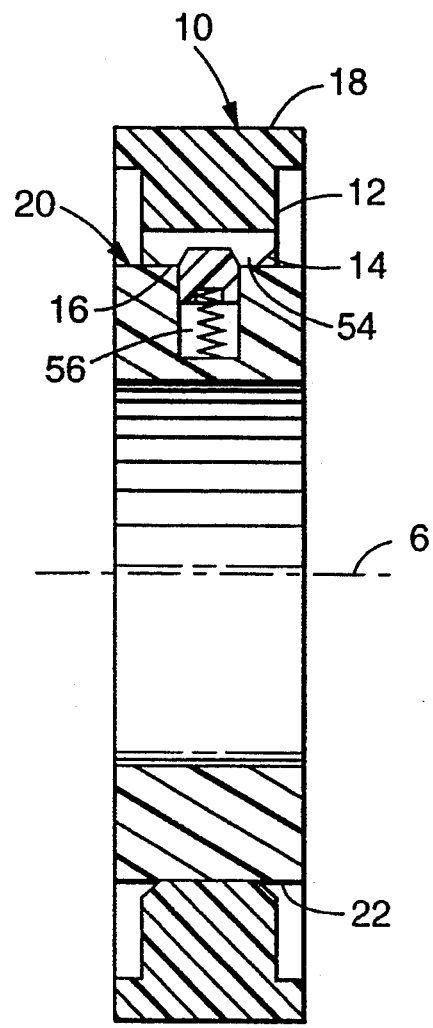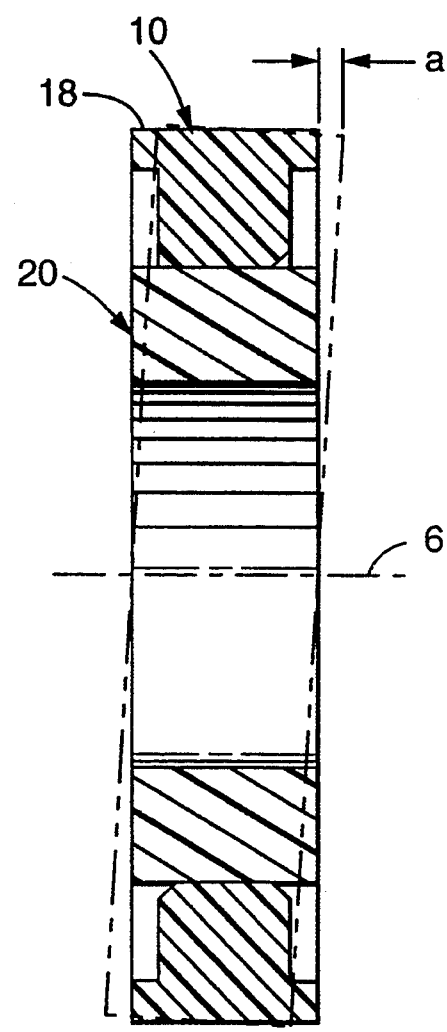
*Fig.5*  *Fig.6*

HUB ALIGNING ROTARY CHUCK

TECHNICAL FIELD

The present invention relates to a rotary chuck for winding magnetic recording tape onto a hub. More particularly, the present invention relates to an alignment system for aligning a tape winding hub relative to the axis of rotation of a rotary chuck.

BACKGROUND OF THE INVENTION

The winding of webs of film onto rolls is an important industrial operation because many commonly used film materials, such as magnetic recording tape, would become impractical if they could not be stored and transported in roll form. Complete use of the advantages inherent in the roll form of tape storage requires that certain conditions of tape winding be met. During winding, each wrap, or strand, of magnetic recording tape wound onto the roll must be precisely aligned to be accurately superimposed over the previously wound strand. If a strand is misaligned, one of its edges can protrude beyond the edge of the overall roll, thereby leaving it unprotected and subject to damage during handling. Moreover, rolls of tape having unaligned strands have an unsightly appearance due to the roughness of the sides of the roll formed by misaligned edges of the strands. Also, the winding speed must be sufficiently low to prevent excessive vibration of the roll because vibration causes misaligned strands. This imposes a significant constraint upon productivity, because higher winding speeds are essential to improved productivity. There is a need to provide a way to reduce roll vibration at higher winding speeds.

Two major causes of tape roll vibration during high speed winding are eccentricity and hub wobble. Hub wobble results from axial misalignment, or skew, of the tape roll, relative to the axis of rotation of winding. When the roll of tape is in axial alignment, it rotates in a plane perpendicular to the axis of rotation, with no movement of the outer periphery of the roll in the axial direction. Eccentricity results when the axis of the roll of tape being wound is not coincident, though it may be parallel with, the axis of rotation of winding. Coincidence of the geometric axis of the tape roll with the axis of winding rotation is called radial alignment.

Magnetic recording tape is typically wound onto a circular core, or hub, which is mounted on a rotating mandrel using a holding device typically called a rotary chuck. Typical hubs suitable for winding magnetic tape are disclosed in U.S. Pat. Nos. 3,632,053 and 4,923,137. In achieving radial and axial alignment of tape rolls, it is essential to radially and axially align the hub on which the tape is to be wound.

Radially and axially aligning rotating members which assure rotation parallel to a fixed plane without eccentricity or wobble, are well known. However, known alignment systems can not be readily applied to manufacturing situations, where the rotating members must be quickly installed and aligned without time-consuming adjustment. For example, when the rotating members are hubs for carrying rolls of magnetic tape, production workers must be able to quickly install them radially and axially aligned.

In U.S. Pat. No. 3,934,833, a hub holding system has a shoulder against which hubs can be pressed to help improve alignment. Unfortunately, these aligning shoulders are not retractable, and it appears that during roll changes, virtually the entire mandrel assembly must be disassembled to remove finished rolls and install new hubs. Additionally, it is not clear that the alignment shoulders provide adequate alignment for large diameter rolls of tape, since nothing seats the hubs against the shoulder of the chuck. Further, no mating reference surfaces between the hub and the chuck are specified as suitable for providing adequate hub alignment.

An additional constraint upon the type of hub alignment system which can be used is that it is often necessary to mount several hubs on a single mandrel. U.S. Pat. No. 4,332,356 discloses a system for holding several hubs on a single chuck, but with no system for alignment. Winding devices of this sort are commonly used where a wider web is slit into narrower tapes, as is commonly done in the manufacture of magnetic recording tapes. An important feature of this type of winding apparatus is that all of the hubs be allowed to slide onto the mandrel, and the finished rolls of wound material be quickly removable from the mandrel with a minimum of mechanical disassembly.

There is a need for a rotary chuck for holding a film winding hub in precise radial and axial alignment relative to a rotating mandrel to allow high speed winding without eccentricity effects or hub wobble. There is also a need for a rotary chuck for holding a tape winding hub in precise radial and axial alignment in which several chucks can be installed on a single mandrel for simultaneous winding of several tapes and which is suitable for use in a large scale manufacturing process. There is a need for such a rotary chuck which allows quick and easy installation, with automatic alignment, of the hub onto the chuck, and allows quick and easy removal of wound rolls from the chuck.

SUMMARY OF THE INVENTION

The present invention is a rotary chuck having both radial and axial alignment detents for properly positioning a hub relative to the rotary chuck. The rotary chuck also can have a drive detent for rotationally locking the hub in relation to the rotary chuck. The rotary chuck precisely seats the hub in mating engagement with the alignment detents. This is facilitated by imparting various motions to the hub relative to the chuck during alignment.

BRIEF DESCRIPTION OF THE DRAWINGS

FIG. 5 is a cross-sectional view of a rotary chuck according to the present invention having a retractable drive detent.

FIG. 6 is a cross-sectional view of a rotary chuck showing the measurement of skew as total axial runout.

DETAILED DESCRIPTION OF PREFERRED EMBODIMENTS

The significance of radial and axial alignment in high speed tape winding does not appear to have been previously recognized. It has been discovered that vibration of the tape roll, due to eccentricity and hub wobble during winding, causes strand misalignment even at moderate winding speeds, and can cause the tape to completely fail to wind onto the roll, at higher winding speeds. This causes the tape to fly into a tangled mass and is sometimes called a wipeout.

Figure 1:
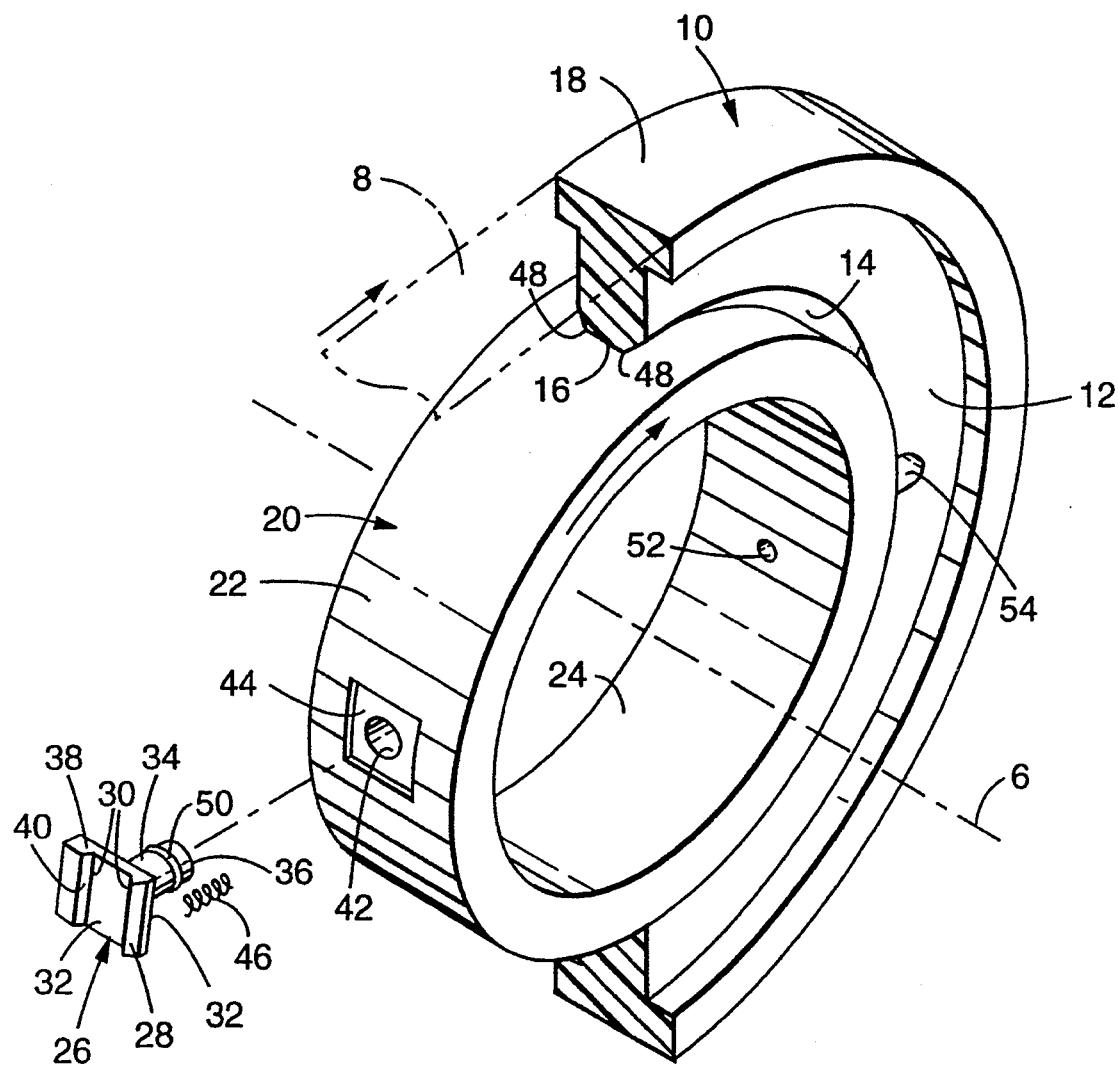
FIG. 1 is a perspective view of the rotary chuck with an alignment detent of the present invention.

FIG. 1 shows a rotary chuck in which radial and axial alignment are performed by detents. The hub 10 has a side face 12, an angled side face 14 adjacent the side face 12, an inner peripheral surface 16, and an outer peripheral surface 18. The hub 10 is installed over the outer peripheral surface 22 of the rotary chuck 20. During winding, the rotary chuck 20 is rotated around axis 6 to wind tape 8 onto the outer peripheral surface 18 of the hub 10. The chuck 20 is typically carried on a rotating mandrel (not shown) which engages the inner peripheral surface 24 of the chuck 20.

Preferably, the rotational coupling between the mandrel and the chuck 20 allows for a speed differential to occur between the mandrel and the chuck 20. This allows several chucks 20 to be operated on a single mandrel while maintaining a prescribed level of tension in each of several tapes 8 being wound by the mandrel. A suitable rotational coupling is a magnetic hysteresis clutch of the type disclosed in U.S. Pat. No. 3,934,833. Frictional coupling, as disclosed in U.S. Pat. No. 4,978,083, also can be used.

Figure 3:
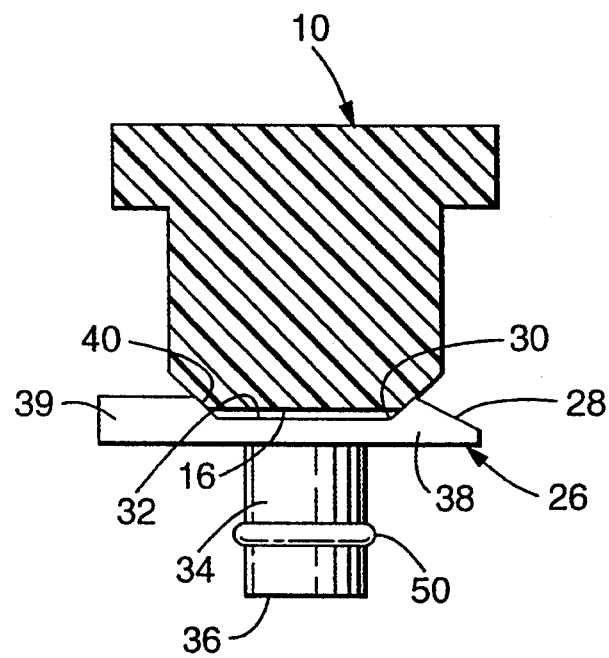
FIG. 3 is a cross-sectional view of an axial alignment detent of the rotary chuck of the present invention.

The hub 10 is aligned on the chuck 20, both radially and axially, relative to the axis 6 by alignment detents 26, best shown in FIG. 3. Each detent 26 has an outer angled face 28, corner lines 30, and a bottom portion 32. Each detent 26 also includes a piston 34, which has an end face 36 and which is fixed to the bottom portion 32 of the detent. A side ear 38 is attached to the bottom portion 32. A second side ear 39 can be spaced from the first side ear 38 a distance less than the width of the hub 10. Inner faces 40 of the side ears 38 join the bottom portion 32 along inner detent corner lines 30. The side ears 38 are spaced sufficiently close to each other to engage the hub 10 before the inner peripheral surface 16 of the hub 10 encounters the bottom portion 32 of detent 26. This provides clearance between the inner peripheral surface 16 of the hub 10 and the bottom portion 32 of the detent 26 and provides axial alignment. An 0-ring 50 is mounted on the piston 34.

The piston 34 is insertable into an aperture 42 in the chuck 20 to a depth sufficient to allow the bottom portion 32 and side ears 38 to fit into a recess 44 surrounding the aperture 42. This allows the outermost portions of the side ears 38 to be depressed below the outer peripheral surface 22 of the chuck 20 to allow the hub 10 to slip over the outer peripheral surface 22 without interference from detents 26.

With no hub installed on chuck 20, the detents 26 are urged into positions above the outer peripheral surface 22 by springs 46 or any other suitable biasing device. Each detent 26 can be constrained from being completely forced out of the aperture 42 by, for example, a pin or other keying device (not shown) inserted into an oversize hole (not shown) passing transversely through the piston 34 and through a tightly fitting hole in the inner peripheral surface 24 of the chuck 20. The detents 26 thereby provide a retractable alignment system which is forced inwardly by the engagement of the angled side face 14 of the hub 10 with outer angled faces 28 of the detents 26 when the hub 10 is slid onto the chuck 20.

After the hub 10 is installed over the outer peripheral surface 22 of the chuck 20, the inner faces 40 of the side ears 38 of the detents 26, under the outward urging of the spring 46, engage the circular edges shared by the inner peripheral surface 16 and the angled side faces 14 of the hub 10, called reference circles 48. Engagement of the reference circles 48 with the inner faces 40 of the detent side ears 38 urges the hub 10 into axial alignment with respect to the axis 6 of rotation. The width of the bottom portion 32 of the detent 26 is slightly less than the width of the inner peripheral surface 16 of the hub 10; when the inner faces 40 engage reference circles 48, a clearance exists between the bottom portion 32 of the detent 26 and the inner peripheral surface 16 of the hub 10, so that the only contact between the detents 26 and the hub 10 is along reference circles 48. This is shown in FIG. 3.

To allow the inner faces 40 of the detents 26 to engage the reference circles 48, the angles between the bottom portion 32 and the inner faces 40 should be greater than the angles between the inner peripheral surface 16 and the angled side faces 14 of the hub 10, although the specific value of the angle is not critical. Also, while the specific hub shown in FIG. 1 is a standard type commonly used to wind magnetic recording tape, hubs having other dimensions could be used, provided alterations are made to the detents 26 to provide mating engagement with the hub. For example, while the angle of the angled side faces 14 with the inner peripheral surface 16 of the hub 10 is shown as being approximately 45°, other angles can be used While the engagement of the inner faces 40 of the detents 26 with the hub reference circles 48 would axially align the hub 10 with respect to the chuck 20 if complete engagement of all of the inner faces 40 with reference circles 48 occurred, it has been found that in practice, such complete mating of the surfaces is not easily achieved. Even if complete engagement of the inner faces 40 with reference circles 48 occurs during installation of the hub 10 onto the chuck 20 to produce axial alignment, it is still possible that the hub 10 may not be centered radially relative to the chuck 20. Even though the rotational axis of hub 10 may be parallel to the axis 6, it still may not be coincident with the axis 6. Therefore, some additional system for centering the hub 10 with respect to the axis 6 is needed.

Additionally, even if an acceptable level of axial and radial alignment could be achieved by this system, it is difficult to maintain this alignment during winding. Part of the reason for this is that the springs 46 cannot be made sufficiently stiff to provide adequate aligning force to the detents 26, while still allowing the detents 26 to be pressed down into the recesses 44 during the installation of the hub 10 onto the chuck 20. For this reason, additional outward force is provided to force the detents 26 against the inner peripheral surface 16 of the hub 10 after the hub 10 has been installed onto the chuck 20.

A suitable system for providing additional outward force to the detents 26 is to apply air pressure to the end faces 36 of the pistons 34. This urges the detents 26 outwardly against the hub 10 pressing the inner faces 40 of the side ears 38 of the detents 26 more firmly against the reference circles 48 of the hub 10, resulting in a more positive alignment. Air leakage between the piston 34 and the aperture 42 is precluded by a seal, such as an elastomeric quad-ring or 0-ring 50. Pressurized air is provided to the apertures 42 by internal passages in the chuck 20, which are fed from the aperture 52, which is supplied with pressurized air from internal passages in the support mandrel. Alternatively, air pressure can be applied to the pistons 34 without using a spring 46.

A drive notch 54 can be formed in the inner peripheral surface 16 of the hub 10 to accept an optional drive detent 56, shown in FIG. 5. This rotationally locks the hub 10 relative to the rotary chuck 20 during winding. The frictional force of the detents 26 against the inner peripheral surface 16 of the hub 10 is normally sufficient to assure adequate rotational coupling between the hub 10 and the chuck 20.

Even with the application of air pressure to the end faces 36 of the pistons 34, complete mating of the inner faces 40 of the detents 26 with the reference circles 48 of the hub 10 does not always readily occur. Thus, the hub 10 can remain slightly skewed relative to the chuck 20, even after the application of air pressure. Mating the hub 10 to the chuck 20 without skew can be greatly improved if the hub 10 is maintained in relative motion with respect to the chuck 20 while air pressure is applied to the detents 26. This permits the hub 10 to seat on the chuck 20 for good axial alignment.

One type of relative motion which improves hub alignment is rotating the hub 10 around the axis 6 relative to the chuck 20 while air pressure is applied to the detents 26. Such relative motion might be imparted, for example, by holding the hub 10 stationary while rotating the chuck 20 and while applying air pressure to the detents 26. With the tape adhered to the hub 10, tension is induced in the tape which provides a tangential force to help create the relative rotation. Alternatively, the chuck 20 can be held stationary and the hub 10 rotated around the axis 6 relative to the chuck 20 while applying air pressure to the detents 26. If drive detents 56 are used, it would be necessary to disengage these detents during this operation.

Figure 2:
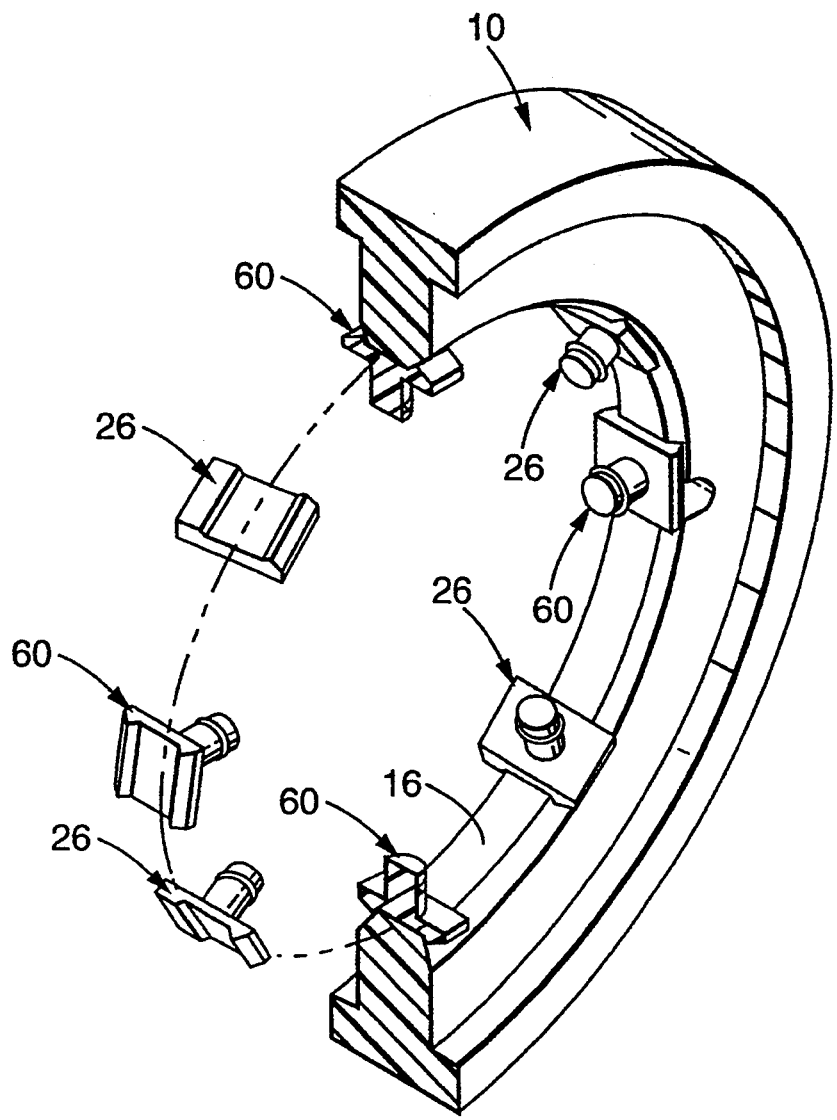
FIG. 2 is a perspective view of a rotary chuck according to another embodiment of the present invention using both radial and axial alignment detents.

In a second embodiment shown in FIG. 2, two different types of detents contact alternate positions around the inner peripheral surface 16 of the hub 10 to align the hub 10 on the chuck 20. The alignment detents 26 serve as axial alignment detents and are the primary axial alignment device, and radial alignment detents 60 are the primary radial alignment device. In this embodiment, relative motion during alignment is provided by the side ears of radial alignment detents 60, which impart an axial movement to those portions of the hub 10 with which they contact. Four axial alignment detents 26 and four radial alignment detents 60 can be uniformly and alternatingly spaced around the outer peripheral surface 22 of the chuck 20. Alternatively, more or fewer detents 26, 60 can be used.

While each type of detent 26, 60 has its primary function, it is also recognized that the process of moving the hub 10 into its aligned position can, by virtue of the various motions imparted to the hub 10 by the alignment detents, produce interaction between the radial alignment detents 60 and the axial alignment detents 26. Movement of the hub 10 into a radially aligned position by the radial alignment detents 60 can, at the same time, aid in achieving axial alignment; and movement of the hub 10 into an axially aligned position by the axial alignment detents 26 can aid in achieving radial alignment. The result of these interacting motions is that the hub 10 is more accurately aligned both radially and axially with respect to the axis 6 than has been previously achievable with known rotary chucks.

Figure 4:
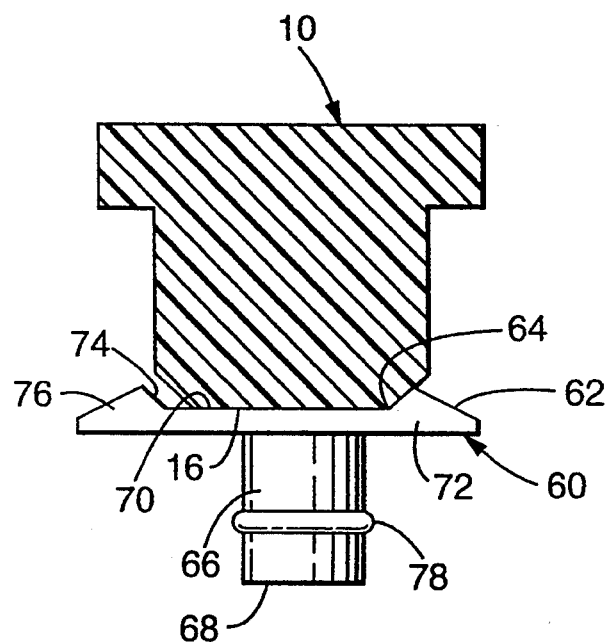
FIG. 4 is a cross-sectional view of a radial alignment detent of the rotary chuck of the present invention.

Referring to FIG. 4, the radial alignment detent 60 is similar to the axial alignment detent 26. The radial alignment detent 60 has an outer angled face 62 and corner lines 64. Each detent 60 also includes a piston 66, which is fixed to the bottom portion 70 of the detent and has an end face 68. Side ears 72 are attached to the bottom portion 70. Inner faces 74 of the side ears 72 join the bottom portion 70 along inner detent corner lines 64. It is preferred that all side ears 72 be located on the same side of the chuck 20. A second side ear 76 can be spaced from the first side ear 72 such that when the hub 10 is on the chuck 20, the side ear 76 is spaced a distance away from hub 10. This is especially useful when the detent 60 is heat treated after fabrication, to improve wear resistance during use, since detents having a greater degree of symmetry are less prone to distortion during heat treatment. A quad-ring or O-ring 78 is mounted on the piston 66.

The radial alignment detents 60 are insertable into apertures 42, similar to axial alignment detents 26. Similarly, the detents 60 are urged outwardly toward the inner peripheral surface 16 of the hub 10 upon application of compressed air to the chuck 20. The O-rings 78 seal and prevent excessive loss of pressurized air between the pistons 66 and the wall of the aperture 42. The radial alignment detents 60 can be held within the apertures 42 by pins passing through transverse holes in the pistons 66 in the manner described for the axial alignment detents 26.

The radial alignment detents 60 are similar in structure to the axial alignment detents 26. However, the radial alignment detents 60 require only one functional side ear 72, rather than the two side ears 38, 39 found on the axial alignment detents 26. Also, the bottom portions 70 of the radial alignment detents 60 contact the inner peripheral surface 16 of the hub 10 when air pressure is applied to the chuck 20. Only the inner faces 40 of the axial alignment detents 26 contact the hub 10. As a result, radial alignment is provided primarily by the radial alignment detents 60, while axial alignment is provided primarily by the axial alignment detents 26, and seating of the hub 10 is facilitated by the side ears 72 of the radial alignment detents 60.

When four radial alignment detents 60 are evenly spaced between four axial alignment detents 26, and the hub 10 is installed on the chuck 20 so that it fits between the side ears 38, 39 of the detents 26, any slight skewing of the hub 10 with respect to the chuck 20 during installation will probably not be removed by the application of air pressure to only the detents 26. It is more likely that friction and binding between the hub 10 and the radial alignment detents 60 will inhibit complete alignment and seating of the hub 10 with respect to the chuck 20. However, with axial alignment detents 26 evenly spaced around the chuck 20, some portion of the hub 10 must, due to skew, be nearer to one of the side ears 38, 39 of the detents 26 than to the others. Therefore, as the axial alignment detents 26 move radially outwardly as a result of the application of air pressure to the piston end faces 36, one of the side ears 38, 39 of the detents 26 must encounter the hub 10 before complete contact of the other detents occurs. As a result, the hub 10 is moved away from the skewed position. If the detents 60 have only one side ear, the hub 10 is free to move past its initial position, where it eventually encounters the side ears of one or more of the axial alignment detents 26, which urge it back to a more central position. Thus, a force imbalance can be eliminated after the hub 10 slides off of the ears 72 to yield a statically balanced system without any hub-chuck relative movement.

If the radial alignment detent 60 has only one side ear 72 which contacts the hub 10, the bottom portion 70 can contact the inner peripheral surface 16 of the hub 10, moving it to a more radially aligned position. This not only radially aligns the hub 10, but the resulting motion of the hub 10 relative to the chuck 20 facilitates improved seating of the hub 10 relative to the axial alignment detents 26. As a result of this combination of motions and the application of air pressure to the pistons 34, 66 of the detents 26, 60, the hub 10 moves into both radial and axial alignment.

In one experiment, in which only the alignment detents 26 of the type shown in FIG. 3 were used and no rotary motion was imparted to the hub 10 while air pressure was applied, a hub 10 having an outside diameter of 114 mm (4.5 inches) was found to have a skew, as measured by axial runout "a" measured at the outer diameter of the hub 10 of 0.5 mm (0.020 inches). In FIG. 6, the distance "a" is the total movement, in the direction parallel to the axis 6, of a point on the outer peripheral surface 18 of the hub 10, resulting from one complete rotation of the chuck 20 around the axis 6.

In a second experiment, several trials of installing the same hub on the rotary chuck of the second embodiment, with the aid of the axial alignment detents 26 and the radial alignment detents 60 resulted in an axial runout "a" of less than 0.050 mm (0.002 inches). This level of axial runout was considered negligible, as it had no noticeable adverse effect on high speed, high quality tape winding. Eccentricity was also negligible.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention.

I claim:

1. An apparatus for winding film on a winding hub, wherein the hub has an inner peripheral surface, an outer peripheral surface, and two sides connecting the inner and outer peripheral surfaces, wherein the apparatus comprises:
   a chuck rotatable around an axis, wherein the chuck has an outer peripheral surface capable of engaging the inner peripheral surface of the hub and at least two apertures passing radially therethrough;
   means for nonrotationally fixing the hub to the chuck comprising at least two radially movable alignment detents, wherein each detent is insertable into a respective aperture in the chuck, and wherein at least one alignment detent is an axial alignment detent which nonresiliently fixes the hub to the chuck, is located in the outer peripheral surface of the chuck, and comprises:
   a corner line;
   a bottom portion;
   a piston which has an end face and is fixed to the bottom portion;
   a first side ear attached to the bottom portion which has an inner face which joins the bottom portion along the corner line; and
   a second side ear having an inner face which joins the bottom portion and space from the first side ear a distance less than the width of the hub such that the inner faces of the side ears are spaced sufficiently close to each other to engage the hub and prevent the inner peripheral surface of the hub from contacting the bottom portion of the detent to provide clearance between the inner peripheral surface of the hub and the bottom portion of the detent;
   means for biasing the detent outwardly toward the inner periphery of the hub to secure the hub in position on the chuck; and
   means for imparting relative motion between the hub and the chuck during engagement of the alignment detent with the hub and before winding.

2. The apparatus of claim 1 wherein at least one alignment detent is a radial alignment detent which further comprises a second side ear spaced from the first side ear such that when the hub is fixed on the chuck, the second side ear is spaced a distance away from hub.

3. The apparatus of claim 2 further comprising at least two radial alignment detents and at least two axial alignment detents alternatingly spaced equidistantly around the chuck.

4. The apparatus of claim 3 further comprising at least three radial alignment detents and at least three axial alignment detents.

5. The apparatus of claim 1 wherein the biasing means comprises a spring.

6. The apparatus of claim 1 wherein the biasing means comprises means for applying gas pressure to the end face of the piston.

7. The apparatus of claim 6 wherein the gas pressure applying means urges the detent outwardly against the hub to press the inner face of the side ear of the detent more firmly against the hub.

8. The apparatus of claim 1 wherein the imparting means comprises means for rotating the chuck relative to the hub.

9. An apparatus for winding film on a winding hub, wherein the hub has an inner peripheral surface, an outer peripheral surface, and two sides connecting the inner and outer peripheral surfaces, wherein the apparatus comprises:
   a chuck rotatable around an axis, wherein the chuck has an outer peripheral surface capable of engaging an inner peripheral surface of the hub and at least two apertures passing radially therethrough;
   means for nonrotationally fixing the hub to the chuck comprising at least two radially movable alignment detents, wherein each detent is insertable into a respective aperture in the chuck, and wherein at least one alignment detent is an axial alignment detent which nonresiliently fixes the hub to the chuck, is located in the outer peripheral surface of the chuck, and comprises:
   a corner line;
   a bottom portion;
   a piston which has an end face and is fixed to the bottom portion; and
   a first side ear attached to the bottom portion which has an inner face which joins the bottom portion along the corner line; and
   a second side ear having an inner face which joins the bottom portion and spaced from the first side ear a distance less than the width of the hub such that the inner faces of the side ears are spaced sufficiently close to each other to engage the hub and prevent the inner peripheral surface of the hub from contacting the bottom portion of the detent to provide clearance between the inner peripheral surface of the hub and the bottom portion of the detent; and means for biasing the detent outwardly toward the inner periphery of the hub to secure the hub in position on the chuck.

10. The apparatus of claim 9 wherein at least one alignment detent is a radial alignment detent and further comprises a second side ear spaced from the first side ear such that when the hub is fixed on the chuck, the second side ear is spaced a distance away from hub.

11. The apparatus of claim 10 further comprising at least two radial alignment detents and at least two axial alignment detents alternatingly spaced equidistantly around the chuck.

12. The apparatus of claim 11 further comprising at least three radial alignment detents and at least three axial alignment detents.

13. The apparatus of claim 9 wherein the biasing means comprises a spring.

14. The apparatus of claim 9 wherein the biasing means comprises means for applying gas pressure to the end face of the piston.

15. The apparatus of claim 14 wherein the gas pressure applying means urges the detent outwardly against the hub to press the inner face of the side ear of the detent more firmly against the hub.

16. The apparatus of claim 14 further comprising means for imparting relative motion between the hub and the chuck during the application of air pressure to the detent and before winding.

17. The apparatus of claim 16 wherein the imparting means comprises means for rotating the chuck relative to the hub.

* * * * *